(12) United States Patent
Wu et al.

(10) Patent No.: US 12,488,552 B2
(45) Date of Patent: Dec. 2, 2025

(54) METHOD, APPARATUS, OPTICAL TOUCH DEVICE, AND STORAGE MEDIUM FOR OPTICAL TOUCH IMAGE OPTIMIZATION

(71) Applicant: KOGA TOUCH CO., LTD, Beijing (CN)

(72) Inventors: Zhenyu Wu, Beijing (CN); Yuhui Wang, Beijing (CN)

(73) Assignee: KOGA TOUCH CO., LTD, Beijing (CN)

( * ) Notice: Subject to any disclaimer, the term of this patent is extended or adjusted under 35 U.S.C. 154(b) by 125 days.

(21) Appl. No.: 18/514,605

(22) Filed: Nov. 20, 2023

(65) Prior Publication Data

US 2024/0386691 A1 Nov. 21, 2024

(30) Foreign Application Priority Data

May 18, 2023 (CN) .......... 202310559835.X
Sep. 15, 2023 (CN) .......... 202311199732.3

(51) Int. Cl.
  *G06V 10/141* (2022.01)
  *G06T 5/50* (2006.01)
  (Continued)

(52) U.S. Cl.
  CPC .......... *G06V 10/141* (2022.01); *G06T 5/50* (2013.01); *G06T 7/50* (2017.01); *G06T 7/70* (2017.01);
  (Continued)

(58) Field of Classification Search
  CPC ........ G06V 10/141; G06V 10/60; G06T 7/50; G06T 7/70; G06T 5/50; G06T 2207/20224; H04N 23/11
  (Continued)

(56) References Cited

U.S. PATENT DOCUMENTS

| | | | |
|---|---|---|---|
| 2010/0220077 A1* | 9/2010 | Fukunaga | G06F 3/0421 345/87 |
| 2011/0234535 A1 | 9/2011 | Hung et al. | |
| 2013/0093921 A1 | 4/2013 | Liao et al. | |

FOREIGN PATENT DOCUMENTS

| | | |
|---|---|---|
| CN | 108256415 | 7/2018 |
| CN | 115564945 | 1/2023 |

(Continued)

OTHER PUBLICATIONS

Jul. 29, 2025 Office Action issued in Chinese Patent Application No. 202311199732.3, pp. 1-5 [machine translation included].

(Continued)

*Primary Examiner* — Joel W Fosselman
(74) *Attorney, Agent, or Firm* — Nixon & Vanderhye PC

(57) ABSTRACT

The present disclosure provides a method, apparatus, optical touch device, and storage medium for optical touch image optimization, including turning on an infrared light source based on a preset second interval, wherein the infrared light source is configured to illuminate a touch object of the optical touch device; capturing, at each time the infrared light source is turned on, a first optical touch image and a second optical touch image based on a preset first interval, wherein the first optical touch image is the image captured when the infrared light source is turned on, and the second optical touch image is the image captured when the infrared light source is turned off; and performing subtraction between the first optical touch image and the second optical touch image to obtain an optimized optical touch image, wherein the optimized optical touch image includes the touch object.

14 Claims, 4 Drawing Sheets

(51) Int. Cl.
    *G06T 7/50*          (2017.01)
    *G06T 7/70*          (2017.01)
    *G06V 10/60*        (2022.01)
    *H04N 23/11*        (2023.01)

(52) U.S. Cl.
    CPC ............ *G06V 10/60* (2022.01); *H04N 23/11*
                 (2023.01); *G06T 2207/20224* (2013.01)

(58) Field of Classification Search
    USPC ........................................................ 348/370
    See application file for complete search history.

(56) References Cited

FOREIGN PATENT DOCUMENTS

| KR | 20110058333 | 6/2011 |
|---|---|---|
| WO | 2013/081671 | 6/2013 |

OTHER PUBLICATIONS

Jan. 20, 2025 Office Action issued in Chinese Patent Application No. 202311199732.3, p. 1-10 [machine translation included].
Apr. 30, 2025 Office Action issued in Chinese Patent Application No. 202311199732.3, pp. 1-5 [machine translation included].
First Search of Priority Document 2023111997323, 2 pages.

\* cited by examiner

METHOD, APPARATUS, OPTICAL TOUCH DEVICE, AND STORAGE MEDIUM FOR OPTICAL TOUCH IMAGE OPTIMIZATION

CROSS-REFERENCE TO RELATED APPLICATIONS

The present application claims priority to Chinese patent application No. 2023111997323 filed to the Chinese Patent Office on Sep. 15, 2023, and Chinese patent application No. 202310559835X filed to the Chinese Patent Office on May 18, 2023 the entire contents of which are incorporated herein by reference.

TECHNICAL FIELD

The present disclosure relates to the field of touch technology, specifically involves a method, apparatus, optical touch device, and storage medium for optical touch image optimization.

BACKGROUND ART

Typically, optical touch devices in the existing technology comprise an infrared light source, a touch panel, and two or more cameras. The optical touch device operates by continuously turning on the infrared light source at uniform intervals, such as every 8 ms, to illuminate the touch object on the touch panel. In synchronization with the turning on of the infrared light source, the cameras capture images of the touch object as the touch object image. Subsequently, the touch object image can be processed for recognition and calculations, thus enabling touch localization.

However, there are many interference objects in the touch object image, resulting in difficulty in recognizing the touch object and inaccurate localization. The problem is caused by the fact that the environment in which the optical touch device operates contains ambient light, such as sunlight, that comprises infrared light. The infrared light in the environment illuminates other objects in the environment, and the other objects are captured by the cameras, resulting in the interference objects present in the touch object image.

Currently, to eliminate the interference objects, it is often done by increasing the brightness of the infrared light source through the increase of its power, thus reducing the impact of ambient light interference. However, this method not only increases the power consumption of the infrared light source and shortens its lifespan but also increases the cost and wastes energy.

SUMMARY

In light of this, the objective of the present disclosure is to provide a method, apparatus, optical touch device, and storage medium for optical touch image optimization. This aims to eliminate interference objects and recognize the touch object, and also improve the recognition speed and accuracy of touch objects, reduce the power consumption of the infrared light source, extend its lifespan, and thereby lower costs and save energy.

In the first aspect, the embodiment of the present disclosure provides a method for optical touch image optimization, which is applied to an optical touch device. The method comprises turning on an infrared light source based on a preset second interval, wherein the infrared light source is configured to illuminate a touch object of the optical touch device; capturing, at each time the infrared light source is turned on, a first optical touch image and a second optical touch image based on a preset first interval, wherein the first optical touch image is the image captured when the infrared light source is turned on, the second optical touch image is the image captured when the infrared light source is turned off, and both the first optical touch image and the second optical touch image comprise both the touch object and an interference object; and performing subtraction between the first optical touch image and the second optical touch image to obtain an optimized optical touch image, wherein the optimized optical touch image comprises the touch object.

In optional embodiments of the present disclosure, the above-mentioned step of turning on an infrared light source based on a preset second interval comprises turning on, after the touch object contacts a touch panel of the optical touch device, the infrared light source based on a preset second interval, wherein the infrared light source is configured to illuminate the touch object that is in contact with the touch panel, and not configured to illuminate the interference object that is not in contact with the touch panel.

In optional embodiments of the present disclosure, the above-mentioned optical touch device is illuminated by the ambient light, the touch object in the first optical touch image is illuminated by both the infrared light source and the ambient light, while the interference object in the first optical touch image is illuminated by the ambient light; and the touch object in the second optical touch image is illuminated by the ambient light, and the interference object in the second optical touch image is illuminated by the ambient light.

In optional embodiments of the present disclosure, the step of performing subtraction between the first optical touch image and the second optical touch image to obtain an optimized optical touch image comprises performing subtraction between the first optical touch image and the second optical touch image to eliminate the interference object illuminated by the ambient light, resulting in the optimized optical touch image that comprises the touch object.

In optional embodiments of the present disclosure, the above-mentioned step of capturing a first optical touch image and a second optical touch image based on a preset first interval, the method further comprises identifying the touch object and the interference object based on the brightness of the first optical touch image and the second optical touch image.

In optional embodiments of the present disclosure, the above-mentioned step of obtaining an optimized optical touch image comprises determining a position and shape of the touch object based on the optimized optical touch image.

In optional embodiments of the present disclosure, the above-mentioned method further comprises determining the first interval by adjusting a window-adjusted frame rate of the image sensor.

In optional embodiments of the present disclosure, the first interval is smaller than the second interval, and the first interval is smaller than the second interval; the first interval is less than 1 millisecond, and the second interval is greater than 5 milliseconds but less than 15 milliseconds.

In optional embodiments of the present disclosure, the first interval and the second interval mentioned above are measured using a timer or counter, wherein the timer or counter is a component configured internally or externally to the image sensor.

In the second aspect, the embodiments of the present disclosure provide an apparatus for optical touch image optimization, which is applied to an optical touch device. The method comprises an infrared light source activation module, configured for turning on an infrared light source based on a preset second interval, wherein the infrared light source is configured to illuminate a touch object of the optical touch device; an optical touch image capture module, configured for capturing, at each time the infrared light source is turned on, a first optical touch image and a second optical touch image based on a preset first interval, wherein the first optical touch image is the image captured when the infrared light source is turned on, the second optical touch image is the image captured when the infrared light source is turned off, and both the first optical touch image and the second optical touch image comprise both the touch object and an interference object; and an optical touch image optimization module, configured for performing subtraction between the first optical touch image and the second optical touch image to obtain an optimized optical touch image, wherein the optimized optical touch image comprises the touch object.

In the third aspect, the embodiments of the present disclosure also provide an optical touch device comprising a processor and a memory, wherein the memory stores computer-executable instructions capable of being executed by the processor, and the processor executes the computer-executable instructions to implement the method for optical touch image optimization described above.

In the fourth aspect, the embodiments of the present disclosure also provide a computer-readable storage medium, wherein the computer-readable storage medium stores computer-executable instructions, when the computer-executable instructions are invoked and executed by a processor, the computer-executable instructions prompt the processor to implement the method for optical touch image optimization described above.

The embodiments of the present disclosure offer beneficial effects as follows.

The embodiment of the present disclosure provides a method, apparatus, optical touch device, and storage medium for optical touch image optimization, comprising turning on an infrared light source based on a preset second interval, wherein the infrared light source is configured to illuminate a touch object of the optical touch device; capturing, at each time the infrared light source is turned on, a first optical touch image and a second optical touch image based on a preset first interval, wherein the first optical touch image is the image captured when the infrared light source is turned on, the second optical touch image is the image captured when the infrared light source is turned off, and both the first optical touch image and the second optical touch image comprise both the touch object and an interference object; and performing subtraction between the first optical touch image and the second optical touch image to obtain an optimized optical touch image, wherein the optimized optical touch image comprises the touch object. In this method, it is not necessary to increase the power of the infrared light source to eliminate interference objects and identify touch objects, which can enhance the recognition speed and accuracy of touch objects while reducing the power consumption of the infrared light source, thereby extending the lifespan of the infrared light source and ultimately lowering costs and conserving energy.

Other features and advantages of the present disclosure will be explained in the subsequent summary, and some features and advantages may be deduced from the summary or readily understood or can be known by implementing the technology disclosed herein.

To make the above objectives, features, and advantages of the present disclosure more evident and comprehensible, the following preferred embodiments are described in detail with the drawings.

BRIEF DESCRIPTION OF DRAWINGS

In order to more clearly illustrate the specific embodiments of the present invention or the technical solution in the prior art, the drawings required to be used in the description of the specific embodiment or prior art will be briefly introduced as follows. Obviously, the drawings described below are some embodiments of the present disclosure, for those of ordinary skill in the art, without paying creative labor, may also obtain other drawings according to these drawings.

DETAILED DESCRIPTION OF EMBODIMENTS

In order to clarify the objectives, technical solutions, and advantages of the embodiments of the present disclosure, a clear and complete description of the technical solutions of the present disclosure will be provided below in conjunction with the drawings. It is evident that the described embodiments are part of the embodiments of the present disclosure and not the entirety of the embodiments. Based on the embodiments in the present disclosure, all other embodiments obtained by those of ordinary skill in the art without making inventive efforts are within the scope of protection of the present disclosure.

Figure 1:
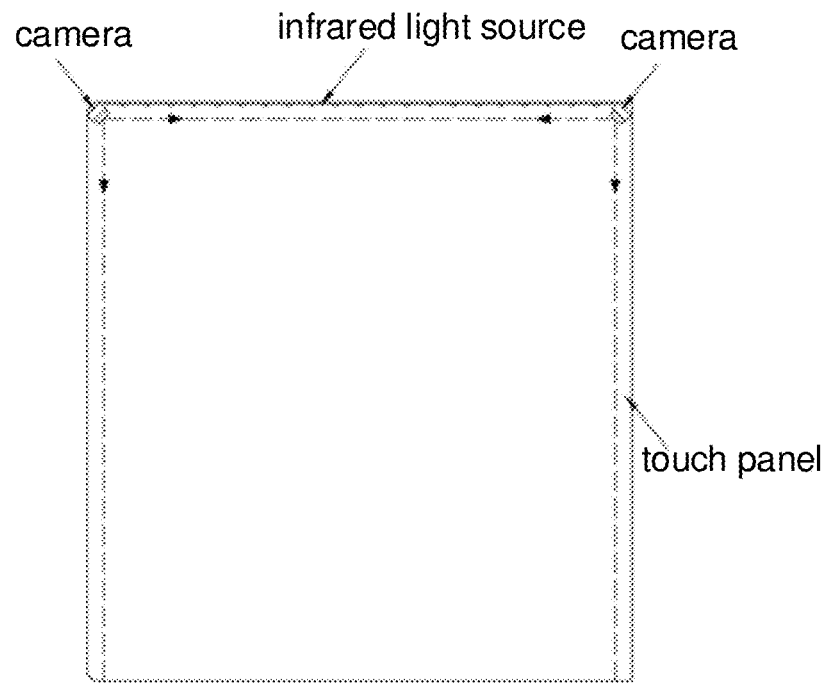
FIG. 1 is a schematic diagram of an optical touch device of the prior art provided in an embodiment of the present disclosure.
Figure 2:
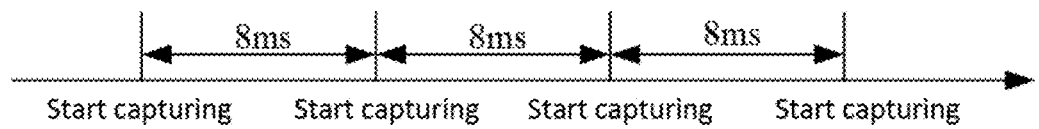
FIG. 2 is a schematic diagram of the prior-art optical touch device obtaining a touch object image provided in an embodiment of the present disclosure.

Currently, referring to the schematic diagram of an optical touch device of the prior art shown in FIG. 1, typically, optical touch devices in the existing technology comprise an infrared light source, a touch panel, and two or more cameras. Referring to the schematic diagram of the prior art optical touch device obtaining a touch object image shown in FIG. 2, the optical touch device operates by continuously turning on the infrared light source at uniform intervals, every 8 ms in FIG. 2, to illuminate the touch object on the touch panel. The cameras are synchronous with the turning-on of the infrared light source (as shown in FIG. 2, it is set to 8 ms), and the cameras capture images of the touch object as the touch object image. Subsequently, the touch object image can be processed for recognition and calculations, thus enabling touch localization. For example, reference can be made to the schematic diagram of a touch object image when the infrared light source is turned on as shown in FIG. 3, wherein FIG. 3 illustrates a touch object, which is a human hand.

Figure 3:
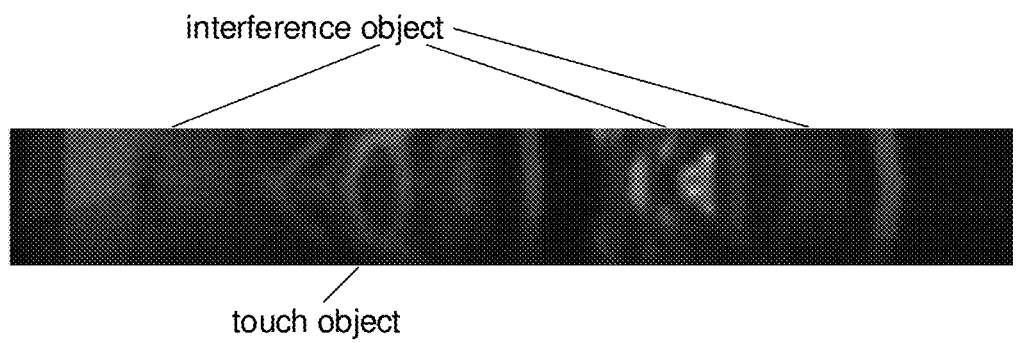
FIG. 3 is a schematic diagram of a touch object image when the infrared light source is turned on provided in an embodiment of the present disclosure.

However, as shown in FIG. 3, there are many interference objects in the touch object image, resulting in difficulty in recognizing the touch object and inaccurate localization. The problem is caused by the fact that the environment in which the optical touch device operates contains ambient light, such as sunlight, that comprises infrared light. The infrared light in the environment illuminates other objects in the environment, and the other objects are captured by the cameras, resulting in the interference objects present in the touch object image.

Currently, to eliminate the interference objects, it is often done by increasing the brightness of the infrared light source through the increase of its power, thus reducing the impact of ambient light interference. However, this method not only increases the power consumption of the infrared light source and shortens its lifespan but also increases the cost and wastes energy.

On this basis, the embodiment of the present disclosure provides a method, apparatus, optical touch device, and storage medium for optical touch image optimization. This aims to eliminate interference objects and recognize the touch objects, and also improve the recognition speed and accuracy of touch objects, reduce the power consumption of the infrared light source, extend its lifespan, and thereby lower costs and save energy.

For a better understanding of the embodiment, a detailed introduction to the method for optical touch image optimization disclosed in the embodiment of the present disclosure will be presented first.

Embodiment 1

Figure 4:
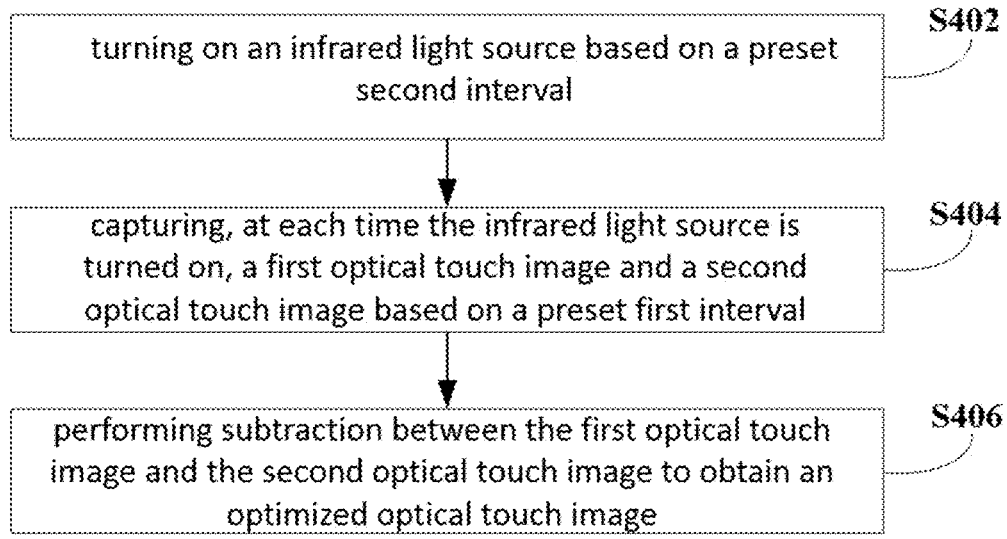
FIG. 4 is a flowchart of a method for optical touch image optimization provided in an embodiment of the present disclosure.

The embodiment of the present disclosure provides a method for optical touch image optimization, which is applied to an optical touch device. Referring to the flowchart of the method for optical touch image optimization shown in FIG. 4, the method for optical touch image optimization comprises the following steps.

Step S402: turning on an infrared light source based on a preset second interval.

As shown in FIG. 1, the optical touch device in the embodiment can comprise an infrared light source, multiple cameras, and a touch panel. The touch object can come into contact with the touch panel. For example, a user can place their hand on the touch panel, and the hand serves as the touch object.

In the embodiment, the infrared light source can be turned on based on the preset second interval. For example, the second interval can be set to 8 ms, which means that the infrared light source can be turned on every 8 ms. Furthermore, the infrared light source is configured to illuminate the touch object that is in contact with the touch panel. The infrared light source can be aligned to illuminate the touch panel, and because the touch object is in contact with the touch panel, the infrared light source can illuminate the touch object. Additionally, the interference object typically does not come into contact with the touch panel, so the infrared light source does not illuminate the interference object.

Step S404: capturing, at each time the infrared light source is turned on, a first optical touch image and a second optical touch image based on a preset first interval.

In the embodiment, each time the infrared light source is turned on, two optical touch images are captured based on the preset first interval. These are referred to as the first optical touch image and the second optical touch image. The first optical touch image is the image captured when the infrared light source is turned on, and the second optical touch image is the image captured when the infrared light source is turned off.

For example, with a second interval of 8 ms and a first interval of 1 ms, the infrared light source is turned on and the first optical touch image is captured at 8 ms. Since the turning-on time of the infrared light source is less than the first interval (1 ms), the infrared light source is already turned off at 9 ms and the second optical touch image is captured.

Both the first optical touch image and the second optical touch image can comprise both the touch object and the interference object. Taking the hand of the user as an example of the touch object, the hand of the user is continuously in contact with the touch panel from 8 ms to 9 ms, consequently, both the first optical touch image and the second optical touch image can comprise the touch object. Furthermore, the interference object also remains within the capture range of the cameras continuously. Therefore, both the first optical touch image and the second optical touch image can indeed comprise the interference object.

Step S406: performing subtraction between the first optical touch image and the second optical touch image to obtain an optimized optical touch image.

Additionally, the optimized optical touch image comprises the touch object. In the embodiment, the subtraction between the first optical touch image and the second optical touch image can be performed to eliminate the interference object, resulting in an optimized optical touch image that comprises only the touch object. Therefore, subsequent image processing, such as recognizing the position and shape of the touch object, is simplified.

The embodiment of the present disclosure provides a method for optical touch image optimization, comprising turning on an infrared light source based on a preset second interval, wherein the infrared light source is configured to illuminate a touch object of the optical touch device; capturing, at each time the infrared light source is turned on, a first optical touch image and a second optical touch image based on a preset first interval, wherein the first optical touch image is the image captured when the infrared light source is turned on, the second optical touch image is the image captured when the infrared light source is turned off, and both the first optical touch image and the second optical touch image comprise both the touch object and an interference object; and performing subtraction between the first optical touch image and the second optical touch image to obtain an optimized optical touch image, wherein the optimized optical touch image comprises the touch object. In this method, it is not necessary to increase the power of the infrared light source to eliminate interference objects and identify touch objects, which can enhance the recognition speed and accuracy of touch objects while reducing the power consumption of the infrared light source, thereby extending the lifespan of the infrared light source and ultimately lowering costs and conserving energy.

Embodiment 2

Figure 5:
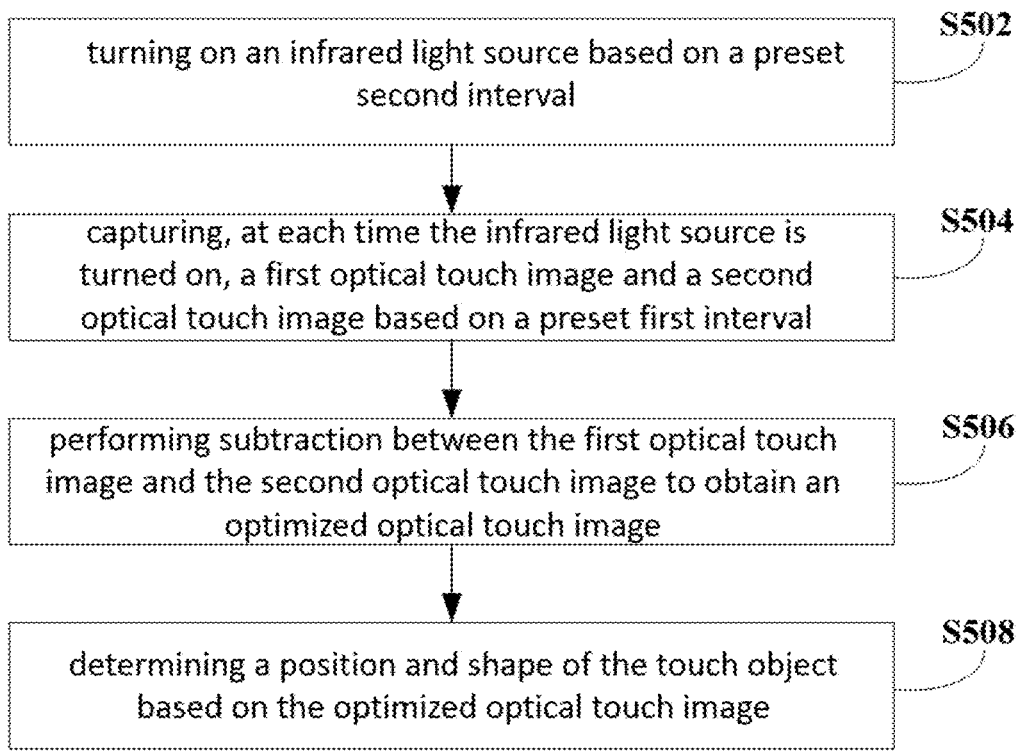
FIG. 5 is a flowchart of another method for optical touch image optimization provided in an embodiment of the present disclosure.

The embodiment provides another method for optical touch image optimization, which builds upon the previous embodiment. Referring to the flowchart of the method of another optical touch image optimization shown in FIG. 5, the method for optical touch image optimization comprises the following steps.

Step S502: turning on an infrared light source based on a preset second interval.

In some embodiments, the infrared light source can be turned on based on the preset second interval after the touch object comes into contact with the touch panel of the optical touch device. In this case, the infrared light source is configured to illuminate the touch object that is in contact with the touch panel, and not configured to illuminate the interference object that is not in contact with the touch panel.

After the touch object comes into contact with the touch panel of the optical touch device, the optical touch device can turn on the infrared light source based on the preset second interval. The infrared light source can be fixed to illuminate the touch panel, and therefore, the infrared light source can illuminate the touch object that is in contact with the touch panel. Additionally, the interference object is typically an object in the surrounding environment. While they are capable of being captured by cameras, they do not come into contact with the touch panel. Hence, the infrared light source is not configured to illuminate the interference object that is not in contact with the touch panel.

In summary, when the infrared light source is turned on, the touch object is illuminated by the infrared light source, while the interference object is not illuminated by the infrared light source.

Step S504: capturing, at each time the infrared light source is turned on, a first optical touch image and a second optical touch image based on a preset first interval.

In some embodiments, the optical touch device is illuminated by the ambient light, and the touch object in the first optical touch image is illuminated by both the infrared light source and the ambient light, while the interference object in the first optical touch image is illuminated by the ambient light; and the touch object in the second optical touch image is illuminated by the ambient light, and the interference object in the second optical touch image is illuminated by the ambient light.

In the embodiment, the ambient light can be sunlight outdoors or indoor lighting, among others. The optical touch device can be placed indoors or outdoors, and the optical touch device can be illuminated by ambient light, whether it is outdoor sunlight or indoor lighting. Therefore, regardless of whether the infrared light source is turned on or off, both the touch object and the interference object will be continuously illuminated by the ambient light.

When the infrared light source is turned on, the touch object is illuminated by both the infrared light source and ambient light, while the interference object is illuminated by ambient light. In this optical scenario, if the touch object is still a human hand, as shown in FIG. 3, the touch object image shown in FIG. 3 represents the first optical touch image. The first optical touch image contains both the touch object and the interference object.

Figure 6:
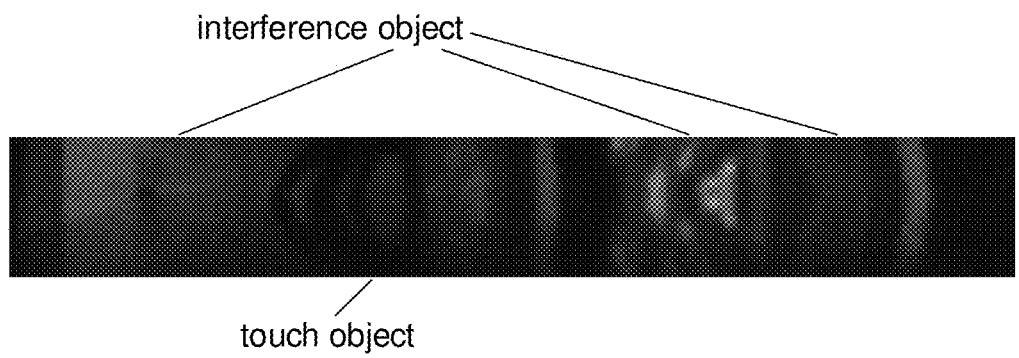
FIG. 6 is a schematic diagram of a second optical touch image provided in an embodiment of the present disclosure.

When the infrared light source is turned off, the touch object is illuminated by ambient light, and the interference object is also illuminated by ambient light. In this optical scenario, if the touch object is still a human hand, referring to the schematic diagram of the second optical touch image shown in FIG. 6, the second optical touch image comprises both the touch object and the interference object.

Figure 7:
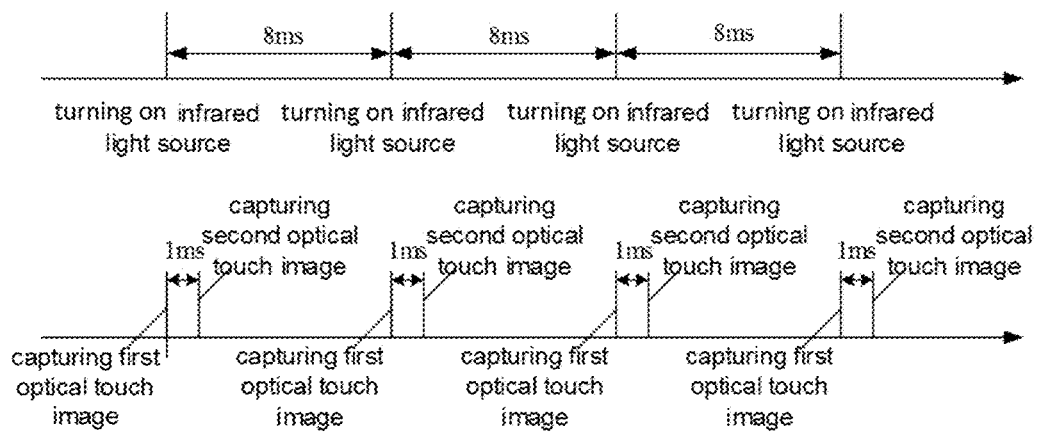
FIG. 7 is a schematic diagram of obtaining the first optical touch image and the second optical touch image in a method for optical touch image optimization provided in an embodiment of the present disclosure.

For a specific example of turning on the infrared light source and capturing the first optical touch image and the second optical touch image through alternating cycles of the first interval and the second interval, the schematic diagram of the method of the optical touch image optimization for obtaining the first optical touch image and the second optical touch image is shown in FIG. 7. As shown in FIG. 7, the second interval is 8 ms, and the first interval is 1 ms. The infrared light source is turned on every 8 ms, with each turning-on lasting less than 1 ms. The camera captures the first optical touch image simultaneously with the turning-on of the infrared light source, and 1 ms after each turning-on of the infrared light source, the camera is able to capture the second optical touch image. Since the turning-on time of the infrared light source is less than 1 ms, the camera is already turned off when capturing the second optical touch image.

Step S506: performing subtraction between the first optical touch image and the second optical touch image to obtain an optimized optical touch image.

In some embodiments, it is able to perform subtraction between the first optical touch image and the second optical touch image to eliminate the interference object illuminated by the ambient light, resulting in the optimized optical touch image that comprises the touch object.

As mentioned in earlier steps, the touch object in the first optical touch image is illuminated by both the infrared light source and ambient light, while the interference object in the first optical touch image is illuminated by ambient light. The touch object in the second optical touch image is illuminated by ambient light, and the interference object in the second optical touch image is also illuminated by ambient light.

Figure 8:
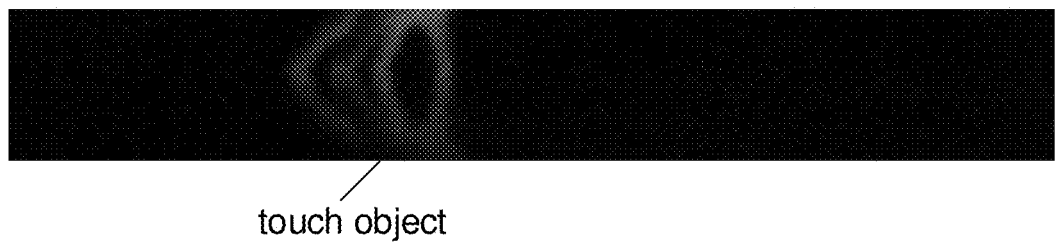
FIG. 8 is a schematic diagram of an optimized optical touch image provided in an embodiment of the present disclosure.

Hence, by performing subtraction between the first optical touch image and the second optical touch image to eliminate the interference object illuminated by the ambient light, the optimized optical touch image that comprises the touch object is obtained. If the touch object is still a human hand, referring to the schematic diagram of the optimized optical touch image shown in FIG. 8, the optimized optical touch image contains only the touch object and does not comprise the interference object.

In some embodiments, it is able to identify the touch object and the interference object based on the brightness of the first optical touch image and the second optical touch image.

Since the infrared light source illuminates the touch object and not the interference object, the turning-on and turning-off of the infrared light source leads to significant changes in the optical effects of the touch object and relatively minor changes in the optical effects of the interference object. Therefore, in the embodiment, the brightness of the first optical touch image and the second optical touch image can be analyzed to identify the portions with significant changes in optical effects as the touch object and the portions with minor changes in optical effects as the interference object.

In the embodiment, by controlling the turning-on and turning-off of the infrared light source, the first optical touch image and the second optical touch image with different optical effects can be obtained correspondingly. It is possible to differentiate between the touch object and interference objects by comparing the degree of brightness change between the two images. Performing subtraction between the first optical touch image and the second optical touch image can eliminate the interference object, resulting in the optimized optical touch image. It is not necessary to increase the power of the infrared light source to eliminate interference objects and identify touch objects, which can enhance the recognition speed and accuracy of touch objects while reducing the power consumption of the infrared light source, thereby extending the lifespan of the infrared light source and ultimately lowering costs and conserving energy.

Step S508: determining a position and shape of the touch object based on the optimized optical touch image.

After obtaining the optimized optical touch image, since the optimized optical touch image contains only the touch object, the embodiment allows for the rapid determination of the position and shape of the touch object. This, in turn, improves the speed and accuracy of the touch object recognition.

In addition, the touch object often moves rapidly on the touch panel rather than remaining stationary. To ensure that there is minimal difference between the first optical touch image and the second optical touch image, and to obtain a completely optimized optical touch image after performing subtraction between the first optical touch image and the second optical touch image, it is necessary to increase the frame rate to reduce the first interval.

In some embodiments, it is able to determine the first interval by adjusting a window-adjusted frame rate of the image sensor. For example, the frame rate is increased by turning down the window of the image sensor, which in turn controls the first interval within a preset range. Preferably, the first interval is set to be smaller than the second interval and less than 1 millisecond.

However, excessively high frame rates can result in high power consumption by the image sensor and processor. To address this, a larger second interval can be configured for buffering adjustments. During the second interval, the image sensor and/or processor can be set to modes such as sleep, standby, or shutdown. The second interval is typically related to the touch reporting rate. Preferably, the second interval is greater than 5 milliseconds and less than 15 milliseconds, typically set between 5 to 15 milliseconds, which corresponds to 60 to 200 frames.

In the embodiment, by setting the first interval and second interval and rapidly capturing the first optical touch image and second optical touch image with a smaller first interval and buffering or adjusting the frame rate with a larger second interval, an uneven continuous image capture can be achieved. This approach not only accommodates the requirements of optical touch devices, such as capturing rapidly moving images of the touch object and ensuring the integrity of optimized images but also helps avoid issues caused by excessive power consumption of image sensors and processors.

Additionally, in some embodiments, the first interval and the second interval mentioned above are measured using a timer or counter, wherein the timer or counter is a component configured internally or externally to the image sensor. In the embodiment, the settings can be adjusted as needed, and the embodiment does not impose specific limitations. When the timer or the counter measures the start and end of the first interval, the infrared light source can be precisely controlled by sending a signal to turn it on or off, thus allowing for accurate control of the infrared light source.

In the above method provided in the embodiment, by controlling the turning-on and turning-off of the infrared light source, the first optical touch image and the second optical touch image with different optical effects can be obtained correspondingly. It is possible to differentiate between the touch object and interference objects by comparing the degree of brightness change between the two images. Performing subtraction between the first optical touch image and the second optical touch image can eliminate the interference object, resulting in the optimized optical touch image. It is not necessary to increase the power of the infrared light source to eliminate interference objects and identify touch objects, which can enhance the recognition speed and accuracy of touch objects while reducing the power consumption of the infrared light source, thereby extending the lifespan of the infrared light source and ultimately lowering costs and conserving energy.

In the above method provided in the embodiment, additionally, by setting the first interval and second interval and rapidly capturing the first optical touch image and second optical touch image with a smaller first interval and buffering or adjusting the frame rate with a larger second interval, an uneven continuous image capture can be achieved. This approach not only accommodates the requirements of optical touch devices, such as capturing rapidly moving images of the touch object and ensuring the integrity of optimized images but also helps avoid issues caused by excessive power consumption of image sensors and processors.

In the above method provided in the embodiment, the measurement of the first interval and second interval can be made by using a timer or counter. When the timer or counter measures the start and end of the first interval, the infrared light source can be precisely controlled by sending a signal to turn it on or off, thus allowing for accurate control of the infrared light source.

Embodiment 3

Figure 9:
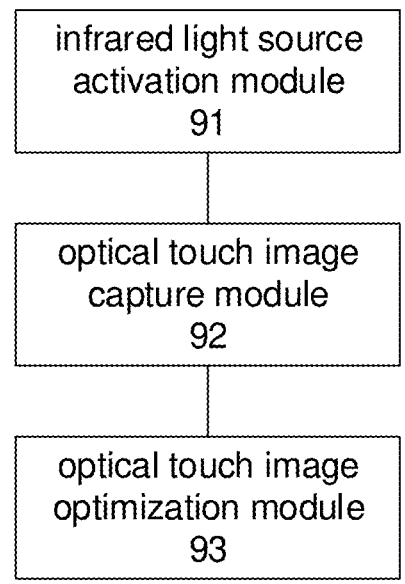
FIG. 9 is a structural schematic diagram of an apparatus for optical touch image optimization provided in an embodiment of the present disclosure.

Corresponding to the above method embodiments, the embodiment of the present disclosure provides an apparatus for optical touch image optimization, which is applied to an optical touch device. Referring to the schematic diagram of the apparatus for optical touch image optimization as shown in FIG. 9, the apparatus for optical touch image optimization comprises:

an infrared light source activation module 91, configured for turning on an infrared light source based on a preset second interval, wherein the infrared light source is configured to illuminate a touch object of the optical touch device;

an optical touch image capture module 92, configured for capturing, at each time the infrared light source is turned on, a first optical touch image and a second optical touch image based on a preset first interval, wherein the first optical touch image is the image captured when the infrared light source is turned on, the second optical touch image is the image captured when the infrared light source is turned off, and both the first optical touch image and the second optical touch image comprise both the touch object and an interference object; and an optical touch image optimization module 93, configured for performing subtraction between the first optical touch image and the second optical touch image to obtain an optimized optical touch image, wherein the optimized optical touch image comprises the touch object.

The embodiment of the present disclosure provides an apparatus of optical touch image optimization, configured for turning on an infrared light source based on a preset second interval, wherein the infrared light source is configured to illuminate a touch object of the optical touch device; capturing, at each time the infrared light source is turned on, a first optical touch image and a second optical touch image based on a preset first interval, wherein the first optical touch image is the image captured when the infrared light source is turned on, the second optical touch image is the image captured when the infrared light source is turned off, and both the first optical touch image and the second optical touch image comprise both the touch object and an interference object; and performing subtraction between the first optical touch image and the second optical touch image to obtain an optimized optical touch image, wherein the optimized optical touch image comprises the touch object. In this method, it is not necessary to increase the power of the infrared light source to eliminate interference objects and identify touch objects, which can enhance the recognition speed and accuracy of touch objects while reducing the power consumption of the infrared light source, thereby extending the lifespan of the infrared light source and ultimately lowering costs and conserving energy.

In feasible embodiments, the above-mentioned infrared light source activation module is configured to turn on the infrared light source based on the preset second interval after the touch object comes into contact with the touch panel of the optical touch device. In this case, the infrared light source is configured to illuminate the touch object that is in contact with the touch panel, and not configured to illuminate the interference object that is not in contact with the touch panel.

In feasible embodiments, the above-mentioned optical touch device is illuminated by the ambient light, the touch object in the first optical touch image is illuminated by both the infrared light source and the ambient light, while the interference object in the first optical touch image is illuminated by the ambient light; and the touch object in the second optical touch image is illuminated by the ambient light, and the interference object in the second optical touch image is illuminated by the ambient light.

In feasible embodiments, the optical touch image optimization module is configured for performing subtraction between the first optical touch image and the second optical touch image to eliminate the interference object illuminated by the ambient light, resulting in the optimized optical touch image that comprises the touch object.

In feasible embodiments, the apparatus further comprises a touch object and interference object recognition module, configured for identifying the touch object and the interference object based on the brightness of the first optical touch image and the second optical touch image.

In feasible embodiments, the apparatus further comprises a touch object position and shape determination module, configured for determining a position and shape of the touch object based on the optimized optical touch image.

In feasible embodiments, the apparatus further comprises a first interval determination module, configured for determining the first interval by adjusting a window-adjusted frame rate of the image sensor.

In feasible embodiments, the first interval is set to be smaller than the second interval, the first interval is less than 1 millisecond, and the second interval is greater than 5 milliseconds but less than 15 milliseconds.

In feasible embodiments, the first interval and the second interval mentioned above are measured using a timer or counter, wherein the timer or counter is a component configured internally or externally to the image sensor.

It is clear to those skilled in the field to which it belongs that, for the convenience and brevity of the description, the specific working process of the optical touch image optimization system described above can be referred to as the corresponding process in the foregoing embodiment of the method for optical touch image optimization, and will not be repeated herein.

Embodiment 4

The embodiment of the present disclosure also provides an optical touch device for performing the above method for optical touch image optimization. Referring to the structural schematic diagram of the optical touch device shown in FIG. 10, the optical touch device comprises a memory 100 and a processor 101. The memory 100 is configured for storing one or more computer instructions, and one or more computer instructions are executed by the processor 101 to implement the above method for optical touch image optimization.

Figure 10:
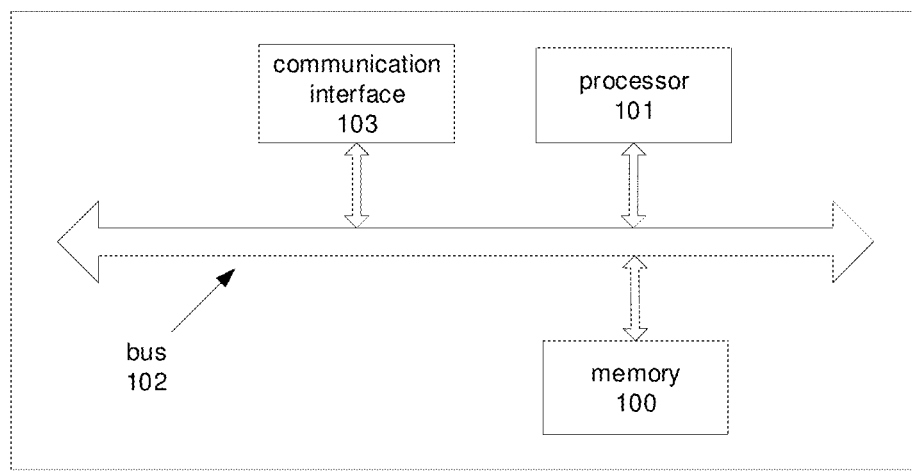
FIG. 10 is a structural schematic diagram of an optical touch device provided in an embodiment of the present disclosure.

Furthermore, the optical touch device shown in FIG. 10 also comprises a bus 102 and a communication interface 103. The processor 101, communication interface 103, and memory 100 are connected via the bus 102.

The memory 100 can comprise high-speed random access memory (RAM) and may also comprise non-volatile memory, such as at least one disk memory. The communication connection between the system network element and at least one other network element is achieved through at least one communication interface 103 (which can be wired or wireless), which can use the Internet, WAN, local network, metropolitan network, etc. The bus 102 can be an ISA bus, PCI bus, or EISA bus, among others. The bus can be divided into address bus, data bus, control bus, etc. For ease of representation, only one bidirectional arrow is used in FIG. 10, but it does not indicate that there is only one bus or one type of bus.

The processor 101 can be an integrated circuit chip with signal processing capability. In the implementation process, the various steps of the above method can be accomplished through integrated logic circuits in the hardware of processor 101 or in the form of software instructions. The processor 101 mentioned above can be a general-purpose processor, comprising a Central Processing Unit (CPU), Network Processor (NP), etc. It can also be a Digital Signal Processor (DSP), Application Specific Integrated Circuit (ASIC), Field-Programmable Gate Array (FPGA), or other programmable logic devices, discrete gates, or transistor logic devices, as well as discrete hardware components. It can implement or perform each of the methods, steps, and logical block diagrams disclosed in the embodiment of the present disclosure. The general-purpose processor can be a microprocessor, or the processor can also be any conventional processor, and so on. The steps of the method disclosed in the embodiments of the present disclosure can be directly implemented as hardware decoding processes by a processor, or a combination of hardware and software modules within a decoding processor. The software modules can be located in random access memory, flash memory, read-only memory, programmable read-only memory, electrically erasable programmable memory, registers, or other mature storage media in this field. The storage medium is located in the memory 100, and the processor 101 reads information from the memory 100, combining it with its hardware to execute the steps of the method of the embodiments mentioned above.

The embodiments of the present disclosure also provide a computer-readable storage medium, wherein the computer-readable storage medium stores computer-executable instructions. When these computer-executable instructions are invoked and executed by a processor, the computer-executable instructions cause the processor to implement the method for optical touch image optimization described above. The specific implementation details can be referred to in the method embodiments, and are not reiterated here.

The computer program product of the method, apparatus, optical touch device, and storage medium for optical touch image optimization provided in the embodiments of the present disclosure comprise a computer-readable storage medium that stores program code. The program code comprises instructions that can be used to execute the method described in the method embodiments above. Specific implementation details can be referred to in the method embodiments and are not reiterated here.

It will be clear to those skilled in the field that, for the convenience and brevity of the description, the specific working processes of the systems and/or apparatus described above can be referred to the corresponding processes in the preceding method embodiments and will not be repeated here.

Additionally, in the description of the embodiment of the present disclosure, unless otherwise clearly stipulated and limited, the terms "provide", "communicate", "connect" and should be understood in a broad sense, for example, it can be a fixed connection, a detachable connection, or an integral connection; it can be a mechanical connection or an electrical connection; and it can be a direct connection, an indirect connection through an intermediary, or an internal communication between two components. Those of ordinary skill in the art can understand the meanings of the above terms in the present disclosure according to specific situations.

The functionality, when implemented as a software functional unit and sold or used as a stand-alone product, can be stored in the computer-readable storage medium. Based on this understanding, the technical solution of the present disclosure can essentially be embodied in the form of a software product, which contributes to or comprises parts of the existing technology. The software product is stored in a storage medium and comprises multiple instructions for causing a computer device (which can be a personal computer, server, network device, etc.) to execute all or some of the steps of the methods described in various embodiments of the present disclosure. The aforementioned storage media comprises various media that can store program code, such as various media that can store program code, such as USB flash drives, mobile hard drives, Read-Only Memory (ROM), Random Access Memory (RAM), disks, or CD-ROMs.

In the description of the present disclosure, it should be noted that the terms "center", "top", "bottom", "left", "right", "vertical", "horizontal", "inside", "outside", etc. indicate an orientation or positional relationship based on the orientation or positional relationship shown in the drawings and are intended only to facilitate and simplify the description of the present disclosure, not to indicate or imply that the device or element referred to must have a particular orientation, be constructed and operate in a particular orientation, and therefore are not to be construed as limiting the present disclosure. In addition, the terms "first", "second", and "third" are used for descriptive purposes only and are not to be construed as indicating or implying relative importance.

Finally, it should be noted that the embodiments described above are specific implementations of the present disclosure used to illustrate the technical solutions of the present disclosure and are not intended to limit its scope. The scope of protection of the present disclosure is not limited to these embodiments, despite the detailed description provided in reference to the aforementioned embodiments. It should be understood by those of ordinary skill in the art that any person skilled in the art can still make modifications or easily envisage variations to the technical solutions described in the aforementioned embodiments within the technical scope disclosed by the present disclosure. Alternatively, some technical features can be equivalently substituted. These modifications, changes, or substitutions do not depart from the essence of the technical solutions of the embodiments of the present disclosure and its scope. All these should be encompassed within the scope of protection of the present disclosure. Therefore, the scope of protection of the present disclosure shall be stated to be subject to the scope of protection of the claims.

What is claimed is:

1. A method for optical touch image optimization, applied for an optical touch device, wherein the method comprises:
   turning on an infrared light source based on a preset second interval, wherein the infrared light source is configured to illuminate a touch object of the optical touch device;
   capturing, at each time the infrared light source is turned on, a first optical touch image and a second optical touch image based on a preset first interval, wherein the first optical touch image is an image captured when the infrared light source is turned on, the second optical touch image is an image captured when the infrared light source is turned off, and both the first optical touch image and the second optical touch image comprise both the touch object and an interference object; and
   performing subtraction between the first optical touch image and the second optical touch image to obtain an optimized optical touch image, wherein the optimized optical touch image comprises the touch object,
   wherein the step of turning on an infrared light source based on a preset second interval comprises:
   turning on, after the touch object contacts a touch panel of the optical touch device, the infrared light source based on the preset second interval,
   wherein the infrared light source is configured to illuminate the touch object that is in contact with the touch panel, and not configured to illuminate the interference object that is not in contact with the touch panel.

2. The method according to claim 1, wherein the optical touch device is illuminated by ambient light;
   the touch object in the first optical touch image is illuminated by both the infrared light source and the ambient light, while the interference object in the first optical touch image is illuminated by the ambient light; and
   the touch object in the second optical touch image is illuminated by the ambient light, and the interference object in the second optical touch image is illuminated by the ambient light.

3. The method according to claim 2, wherein the step of performing subtraction between the first optical touch image and the second optical touch image to obtain an optimized optical touch image comprises:
   performing subtraction between the first optical touch image and the second optical touch image to eliminate the interference object illuminated by the ambient light, resulting in the optimized optical touch image that comprises the touch object.

4. The method according to claim 2, wherein after the step of capturing a first optical touch image and a second optical touch image based on a preset first interval, the method further comprises:
  identifying the touch object and the interference object based on a brightness of the first optical touch image and the second optical touch image.

5. The method according to claim 1, wherein after the step of obtaining the optimized optical touch image, the method further comprises:
  determining a position and a shape of the touch object based on the optimized optical touch image.

6. The method according to claim 1, wherein the method further comprises:
  determining the first interval by adjusting a window-adjusted frame rate of an image sensor.

7. The method according to claim 1, wherein the first interval is smaller than the second interval; and
  the first interval is less than 1 millisecond, and the second interval is greater than 5 milliseconds but less than 15 milliseconds.

8. The method according to claim 1, wherein the first interval and the second interval are measured using a timer or counter, wherein the timer or counter is a component configured internally or externally to an image sensor.

9. An optical touch device, comprising a processor and a memory, wherein the memory stores computer-executable instructions that can be executed by the processor, and the processor executes the computer-executable instructions to implement the method for optical touch image optimization according to claim 1.

10. A non-transitory computer-readable storage medium, wherein the computer-readable storage medium stores computer-executable instructions, when the computer-executable instructions are invoked and executed by a processor, the computer-executable instructions prompt the processor to implement the method for optical touch image optimization according to claim 1.

11. The method according to claim 1, wherein after the step of obtaining the optimized optical touch image, the method further comprises:
  determining a position and a shape of the touch object based on the optimized optical touch image.

12. The method according to claim 1, wherein the method further comprises:
  determining the first interval by adjusting a window-adjusted frame rate of an image sensor.

13. The method according to claim 1, wherein the first interval is smaller than the second interval; and
  the first interval is less than 1 millisecond, and the second interval is greater than 5 milliseconds but less than 15 milliseconds.

14. The method according to claim 1, wherein the first interval and the second interval are measured using a timer or counter, wherein the timer or counter is a component configured internally or externally to an image sensor.

* * * * *